(12) United States Patent
Yabuta et al.

(10) Patent No.: US 7,978,167 B2
(45) Date of Patent: Jul. 12, 2011

(54) DISPLAY APPARATUS AND ELECTRONICS DEVICE

(75) Inventors: Koji Yabuta, Kashiba (JP); Hiroshi Fukushima, Yamatokoriyama (JP); Akira Imai, Nara (JP); Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 842 days.

(21) Appl. No.: 11/525,033

(22) Filed: Sep. 22, 2006

(65) Prior Publication Data

US 2007/0070004 A1 Mar. 29, 2007

(30) Foreign Application Priority Data

Sep. 29, 2005 (JP) ................................. 2005-285476
Jan. 16, 2006 (JP) ................................. 2006-008013

(51) Int. Cl.
G09G 3/36 (2006.01)
(52) U.S. Cl. ................ 345/98; 345/87; 345/90; 345/94; 345/96; 345/100
(58) Field of Classification Search .................. 345/7–9, 345/87–103, 168, 173, 204, 210, 211, 530, 345/629, 634; 349/96, 113–123, 15, 63, 349/8, 16, 196, 197; 353/10, 28, 119; 368/242; 348/51, 47, 42; 455/566
See application file for complete search history.

(56) References Cited

U.S. PATENT DOCUMENTS

| | | | |
|---|---|---|---|
| 4,953,949 A | 9/1990 | Dallas | |
| 5,519,533 A | 5/1996 | Nomura et al. | |
| 5,602,679 A * | 2/1997 | Dolgoff et al. | 359/640 |
| 5,638,082 A | 6/1997 | Grimm | |
| 5,642,214 A | 6/1997 | Ishii et al. | |
| 5,899,551 A | 5/1999 | Neijzen et al. | |
| 5,945,965 A | 8/1999 | Inoguchi et al. | |
| 6,330,001 B1 * | 12/2001 | Nakao | 345/629 |
| 6,373,457 B1 * | 4/2002 | Kim et al. | 345/95 |
| 6,411,326 B1 * | 6/2002 | Tabata | 348/47 |
| 6,414,910 B1 * | 7/2002 | Kaneko et al. | 368/242 |
| 6,473,078 B1 * | 10/2002 | Ikonen et al. | 345/211 |
| 6,518,939 B1 * | 2/2003 | Kikuchi | 345/8 |
| 6,525,707 B1 * | 2/2003 | Kaneko et al. | 345/88 |
| 6,556,267 B2 * | 4/2003 | Koma | 349/129 |

(Continued)

FOREIGN PATENT DOCUMENTS

JP 9-105958 A 4/1997

(Continued)

OTHER PUBLICATIONS

Office Action dated Jan. 21, 2010 in copending related U.S. Appl. No. 11/575,112.

(Continued)

*Primary Examiner* — Prabodh M Dharia
(74) *Attorney, Agent, or Firm* — Nixon & Vanderhye P.C.

(57) ABSTRACT

A display section of a portable phone includes a first polarizer, a switching panel section, a reflective polarizer, and a main panel section. The switching panel section has a liquid crystal layer including a plurality of regions having at least two different alignment directions. This makes it possible, by utilizing the difference in the alignment direction of the liquid crystal layer, to make the image difficult to observe by a sight-line from an oblique direction. Furthermore, it is also possible, by utilizing the mirror-surface displaying caused by the reflective polarizer, to make the image significantly difficult to observe.

11 Claims, 7 Drawing Sheets

U.S. PATENT DOCUMENTS

| | | | |
|---|---|---|---|
| 6,643,224 B1* | 11/2003 | Sekiguchi et al. | 368/242 |
| 6,992,672 B1* | 1/2006 | Niikawa et al. | 345/530 |
| 7,113,159 B2* | 9/2006 | Sawabe | 345/89 |
| 7,397,521 B2* | 7/2008 | Yuuki et al. | 349/63 |
| 7,596,390 B2* | 9/2009 | McDonald | 455/566 |
| 2001/0015782 A1 | 8/2001 | Takato et al. | |
| 2001/0043297 A1* | 11/2001 | Arai | 349/114 |
| 2002/0180922 A1 | 12/2002 | Takato et al. | |
| 2003/0007227 A1 | 1/2003 | Ogino | |
| 2003/0020678 A1* | 1/2003 | Ozawa et al. | 345/87 |
| 2003/0053033 A1* | 3/2003 | Vrachan et al. | 353/31 |
| 2003/0146893 A1* | 8/2003 | Sawabe | 345/89 |
| 2004/0046909 A1* | 3/2004 | Sekiguchi | 349/113 |
| 2004/0066363 A1* | 4/2004 | Yamano et al. | 345/98 |
| 2004/0100598 A1* | 5/2004 | Adachi et al. | 349/113 |
| 2004/0100604 A1 | 5/2004 | Takato et al. | |
| 2004/0233360 A1* | 11/2004 | Yoshida et al. | 349/114 |
| 2005/0001796 A1* | 1/2005 | Liu | 345/87 |
| 2005/0146664 A1* | 7/2005 | Hanaoka et al. | 349/130 |
| 2005/0215291 A1* | 9/2005 | McDonald | 455/566 |
| 2005/0253797 A1* | 11/2005 | Kamada et al. | 345/89 |
| 2005/0270449 A1* | 12/2005 | Koma et al. | 349/114 |
| 2006/0012614 A1* | 1/2006 | Asao et al. | 345/690 |
| 2006/0061717 A1* | 3/2006 | Ichihashi | 349/117 |
| 2007/0057792 A1* | 3/2007 | Alden | 340/572.1 |
| 2007/0146578 A1* | 6/2007 | Yabuta et al. | 349/96 |
| 2007/0171343 A1* | 7/2007 | Fukuda et al. | 349/117 |
| 2008/0042954 A1* | 2/2008 | Lee et al. | 345/89 |
| 2008/0055221 A1* | 3/2008 | Yabuta et al. | 345/90 |
| 2008/0084471 A1* | 4/2008 | Yabuta et al. | 348/42 |
| 2008/0143940 A1* | 6/2008 | Yoshida et al. | 349/114 |
| 2008/0316198 A1* | 12/2008 | Fukushima et al. | 345/214 |
| 2009/0310044 A1* | 12/2009 | Lee | 349/15 |

FOREIGN PATENT DOCUMENTS

| | | | |
|---|---|---|---|
| JP | 11-223680 A | | 8/1999 |
| JP | 2001-264768 | * | 9/2001 |
| JP | 2003-015535 A | | 1/2003 |
| JP | 2004-038035 A | | 2/2004 |
| JP | 2004-062094 A | | 2/2004 |
| JP | 2004-133334 A | | 4/2004 |
| JP | 2006-3754 | | 1/2006 |
| WO | WO 95/27919 | | 10/1995 |

OTHER PUBLICATIONS

International Search Report in related International Application No. PCT/JP2005/016590 dated Oct. 18, 2005.

Office Action in related copending U.S. Appl. No. 11/575,112, filed Mar. 12, 2007.

Machine translation of JP 9-105958 provided by Industrial Property Digital Library (IPDL) of Japan Patent Office (JPO).

Machine translation of JP 2003-015535 provided by Industrial Property Digital Library (IPDL) of Japan Patent Office (JPO).

Machine translation of JP 2004-062094 provided by Industrial Property Digital Library (IPDL) of Japan Patent Office (JPO).

Machine translation of JP 2004-038035 provided by Industrial Property Digital Library (IPDL) of Japan Patent Office (JPO).

Machine translation of JP2006-3754 published Jan. 5, 2006 provided by Industrial Property Digital Library (IPDL) of Japan Patent Office (JPO).

Notice of Allowance dated Jun. 14, 2010 in related U.S. Appl. No. 11/575,112.

* cited by examiner

FIG. 4
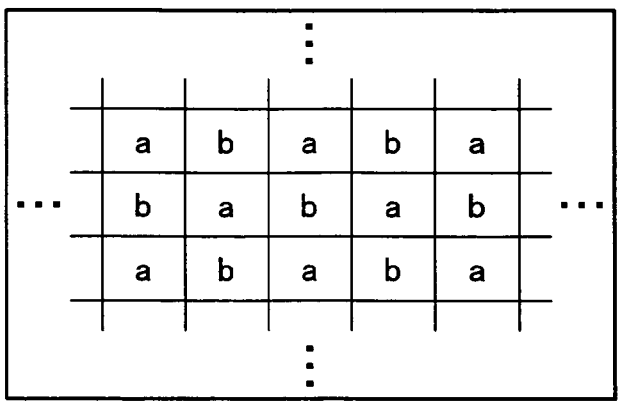
FIG. 5
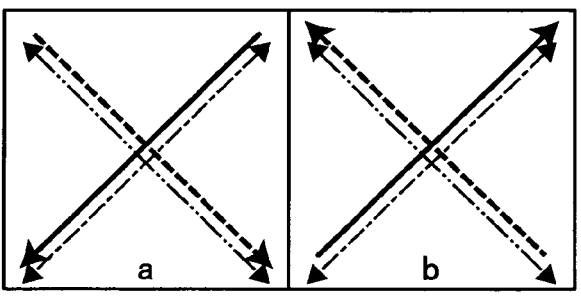
———————— : RUB-AXIS OF SUBSTRATE 23 (NON-OBSERVER'S SIDE)
- - - - - - - - : RUB-AXIS OF SUBSTRATE 21 (OBSERVER'S SIDE)
— — — — — — : POLARIZED-LIGHT AXIS OF SECOND POLARIZER 14 (NON-OBSERVER'S SIDE)
—··—··—··— : POLARIZED-LIGHT AXIS OF FIRST POLARIZER 11 (OBSERVER'S SIDE)
LIQUID CRYSTAL : TN-LIQUID CRYSTAL TWISTED AT 90°
FIG. 6 (a)     FIG. 6 (b)     FIG. 6 (c)
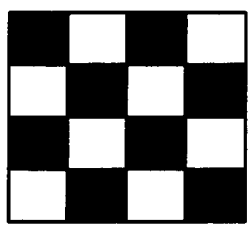  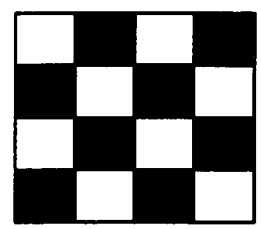

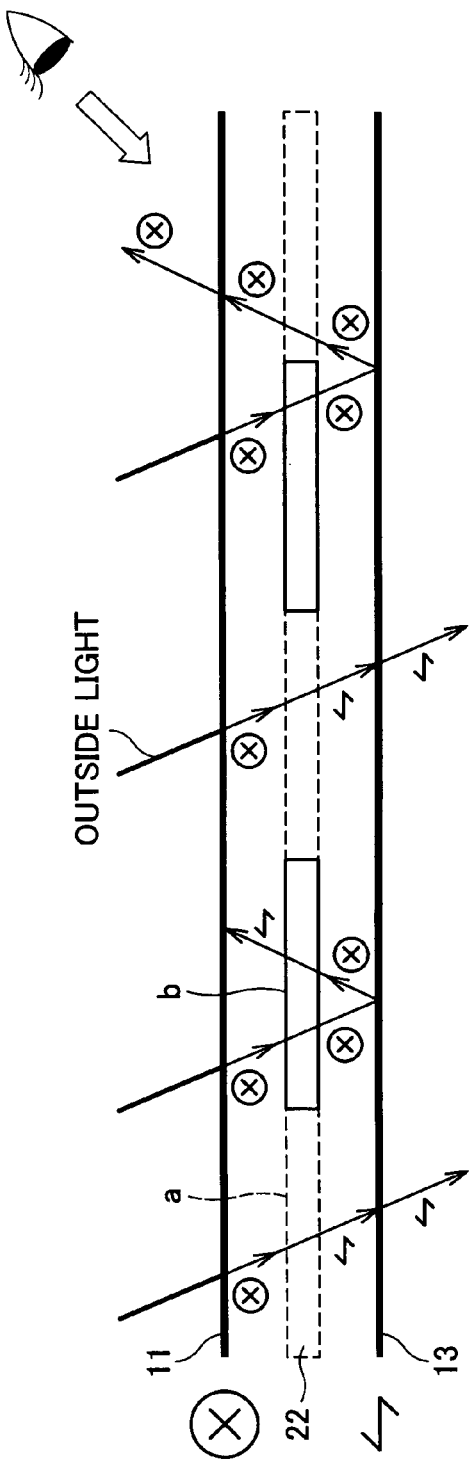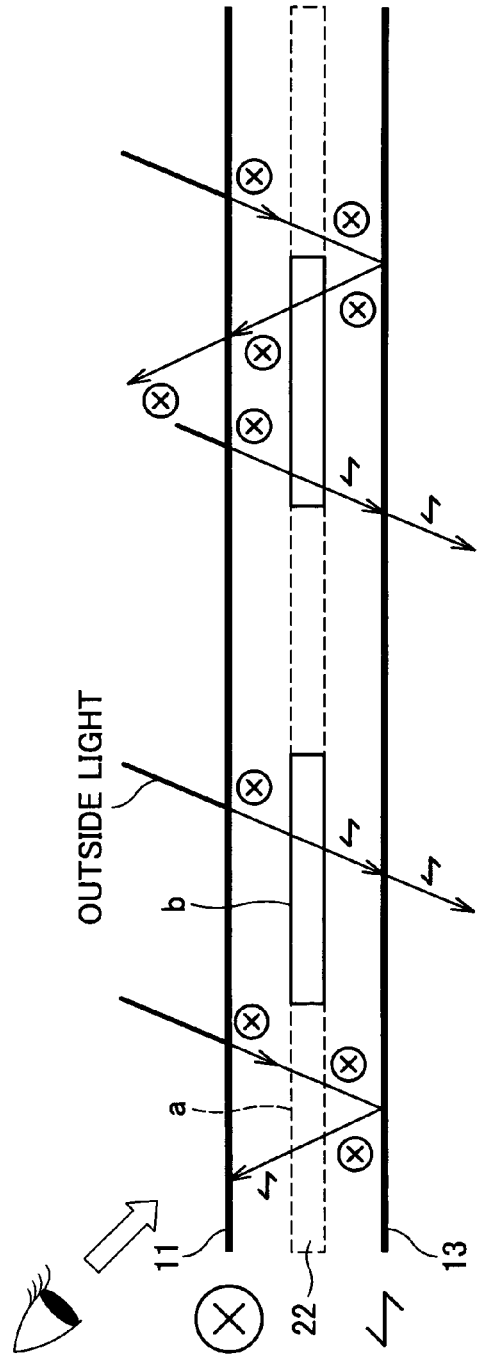

DISPLAY APPARATUS AND ELECTRONICS DEVICE

This Nonprovisional application claims priority under 35 U.S.C. §119(a) on Patent Applications No. 285476/2005 filed in Japan on Sep. 29, 2005, and No. 008013/2006 filed in Japan on Jan. 16, 2006, the entire contents of which are hereby incorporated by reference.

FIELD OF THE INVENTION

The present invention relates to a display apparatus and an electronic device including the display apparatus, and particularly, relates to a display apparatus and an electronic device that make it difficult to observe a displayed image from an oblique direction. The present invention also relates to a display apparatus that allows switching a viewing-angle control function and a mirror function, and an electronic device that includes the display apparatus.

BACKGROUND OF THE INVENTION

In recent years, electronic devices have become lighter and lighter in weight. This allows carrying and using an electronic device that includes a display, such as a portable phone and a mobile PC, in a public area. However, there arises a problem that confidential documents and information for personal use may be observed by a person nearby.

In view of the circumstances, there is suggested a display apparatus that allows switching a viewing-angle control mode. Specifically, the display apparatus is normally set at a wide viewing-angle display mode, and is switched to a narrow viewing-angle mode when used in a public area. The wide viewing-angle mode allows observing a displayed image from all directions. On the other hand, the narrow viewing-angle mode (i) allows observing a displayed image, in a normal way, from the front of the display where a user is, but (ii) makes it difficult to observe the displayed image from an oblique direction (alternatively, a solid image or a different image is seen). Furthermore, it is allowed to switch to a wide viewing-angle display mode so that the display apparatus can accommodate a demand for a wide viewing-angle in a situation where, for example, a number of people desire to see a picturized image.

In order to realize such displaying, there is suggested a structure that, for example, a display apparatus is segmented into several sections, and the respective sections are differentiated in an alignment direction, and the like, of liquid crystal. As such, in the case where the display is observed from a direction other than the front during the narrow viewing-angle mode, an image that is different from what is actually displayed on the display is observed. For example, Japanese Unexamined Patent Publication No. 2001-264768 (published on Sep. 26, 2001) (the publication will be referred to as Patent Document 1 hereinafter (corresponding U.S. applications to the publication include: U.S. Application Publication No. 2001/015782 (published on Aug. 23, 2001)) teaches a liquid crystal display apparatus with alignment layers that (i) sandwich a liquid crystal layer and (ii) are segmented into a plurality of regions, and adjacent regions are different from each other in an orientation direction.

Further, Japanese Unexamined Patent Publication No. 2001-318374 (published on Nov. 16, 2001) (the publication will be referred to as Patent Document 2 hereinafter (corresponding U.S. application to the publication includes U.S. Unexamined Patent Publication No. 2004/0100598, published on May 27, 2004)) teaches a display apparatus that allows switching an image display status and a mirror state.

The structure of Patent Document 1, however, is not adequate for making it difficult to observe a displayed image from an oblique direction (from a side).

Specifically, in the structure, alignment directions in adjacent liquid crystal layers are differentiated from each other so that (i) a region is made to be a light-shielding region (black display) and (ii) an adjacent region thereto is made to be a transmissive region. However, with this structure, the light-shielding region becomes dark, and therefore the transmissive region of displayed image (displayed information) is enhanced. In other words, it is easy to see an image and/or information that is displayed on the display apparatus. The structure of Patent Document 1, therefore, is not adequate for preventing a person from peeking the displayed image from an oblique direction.

Furthermore, neither of Patent Documents 1 and 2 teaches switching a viewing-angle control function and a mirror function. No display apparatus that allows switching a viewing-angle control function and a mirror function has been known.

SUMMARY OF THE INVENTION

The present invention is in view of the above problems, and has as an object to realize a display apparatus that makes it difficult to observe a displayed image by a sight-line from an oblique direction (lateral direction).

Another object of the present invention is to realize a display apparatus that, by switching modes, (i) causes a displayed image to be visible from all directions, (ii) makes it difficult to observe a displayed image from a particular direction, and (iii) allows mirror-surface displaying.

In order to solve the above problems, a display apparatus of the present invention includes: a picture display section for displaying an image; a display switching section, on a front face of the picture display section, for electrically switching a display status of the picture display section; a first polarizer on a front face of the display switching section; a second polarizer between the picture display section and the display switching section; and a reflective polarizer between (i) a rear side of the display switching section and (ii) the second polarizer, the display switching section being a liquid crystal layer including a plurality of regions having at least two different alignment directions of liquid crystal molecules of TN mode. More specifically, the display switching section is adapted so that the display switching section is sandwiched between a pair of substrates.

In the present invention, the "liquid crystal molecules of TN mode" indicate liquid crystal molecules used in a TN mode. Furthermore, "the display switching section is a liquid crystal layer including a plurality of regions having at least two different alignment directions" means that (i) the liquid crystal layer that is used as the display switching section (ii) is driven by the TN mode, and includes a plurality of regions having at least two different alignment directions.

Further, an electronic device of the present invention includes a display apparatus of the present invention.

In the above structure, the liquid crystal layer includes a plurality of regions having at least two different alignment directions. Specifically, there are regions in the liquid crystal layer, which regions are different from each other in an alignment direction of liquid crystal molecules in the regions, and the alignment direction of liquid crystal molecules is differentiated by, for example, differentiating an alignment direction of an alignment layer provided on the substrates. For this reason, in a region where the liquid crystal molecules are directed to a direction, an image is visible from, for example, a right oblique direction, whereas the image is difficult to observe (or invisible) from a left oblique direction. On the other hand, in a region where the liquid crystal molecules are directed in a direction that is opposite to the direction in the above region mentioned first, the way how the image is observed becomes opposite. Specifically, the image is difficult to observe (or invisible) from a right oblique direction, whereas the image is visible from a left oblique direction. As described above, with the above structure, the narrow viewing-angle mode is realized by utilizing the difference in image visibility in oblique directions, which difference is generated by the difference in the alignment direction of the liquid crystal molecules in the liquid crystal layer.

Further, in the above structure, there are a first polarizer, a display switching section, a reflective polarizer, and a second polarizer on a front face of the picture display section. Accordingly, if all of the members are allowed to transmit light, then the structure becomes the same as the structure that include only the picture display section. This allows the image of the picture display section to become visible from all directions. As such, the wide viewing-angle mode is achieved.

Further, in the above structure, the reflective polarizer is provided between (i) a rear side of the display switching section and the second polarizer. The reflective polarizer includes (i) a polarized-light transmission axis and a polarized-light reflectance axis that is orthogonal to the polarized-light transmission axis. For this reason, the reflective polarizer reflects polarized light that is parallel to the polarized-light reflectance axis. This makes it possible to realize mirror-surface display by causing polarized light that is parallel to the polarized-light reflectance axis to enter into the reflective polarizer. As such, the region where the image is difficult to observe (or invisible) is partially displayed in mirror-surface displaying during the narrow viewing-angle mode by utilizing the alignment direction of the liquid crystal layer. By this way, first, it is made difficult to observe the image in the region by utilizing the orientation of the liquid crystal layer, and then it is made further difficult (or invisible) to observe the region by utilizing the mirror-surface displaying.

As described above, with the structure, it becomes possible, by utilizing the difference in the alignment direction of the liquid crystal layer, to make the image difficult to observe by a sight-line from an oblique direction. Furthermore, it is also possible, by utilizing the mirror-surface displaying caused by the reflective polarizer, to make the image significantly difficult to observe.

Note that Patent Document 1 teaches switching the narrow viewing-angle mode and the wide viewing-angle mode, and Patent Document 2 teaches switching the mirror state and the display status. However, neither of the Patent Documents suggests an effect of making it difficult to observe an image by mirror-surface displaying during the narrow viewing-angle mode, which effect has been originally found by the inventors and other persons of the present invention.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4 is a diagram illustrating a distribution of regions with different alignment directions, in a liquid crystal layer of a switching panel section of the display section illustrated in FIG. 1.

FIG. 5 is a diagram illustrating alignment directions in region-a and region-b, respectively.

FIG. 6(a) is a diagram illustrating (i) visible regions and (ii) invisible regions of the display section taken from the left side, in the case where the portable phone according to an embodiment of the present invention is in a narrow viewing-angle mode.

FIG. 6(b) is a diagram illustrating (i) visible regions and (ii) invisible regions of the display section taken from the front, in the case where the portable phone according to an embodiment of the present invention is in the narrow viewing-angle mode.

FIG. 6(c) is a diagram illustrating (i) visible regions and (ii) invisible regions of the display section taken from the right side, in the case where the portable phone according to an embodiment of the present invention is in the narrow viewing-angle mode.

FIG. 10(a) is a cross-sectional diagram of the display section that illustrates an exemplary mechanism of mirror-surface display in the display section taken from the right, in the case where the portable phone according to an embodiment of the present invention is in the narrow viewing-angle mode.

FIG. 10(b) is a cross-sectional diagram of the display section that illustrates an exemplary mechanism of mirror-surface display in the display section taken from the left, in the case where the portable phone according to an embodiment of the present invention is in the narrow viewing-angle mode.

DESCRIPTION OF THE EMBODIMENTS

Embodiment 1

The following describes an embodiment of the present invention, with reference to FIGS. 1 to 7.

Figure 7:
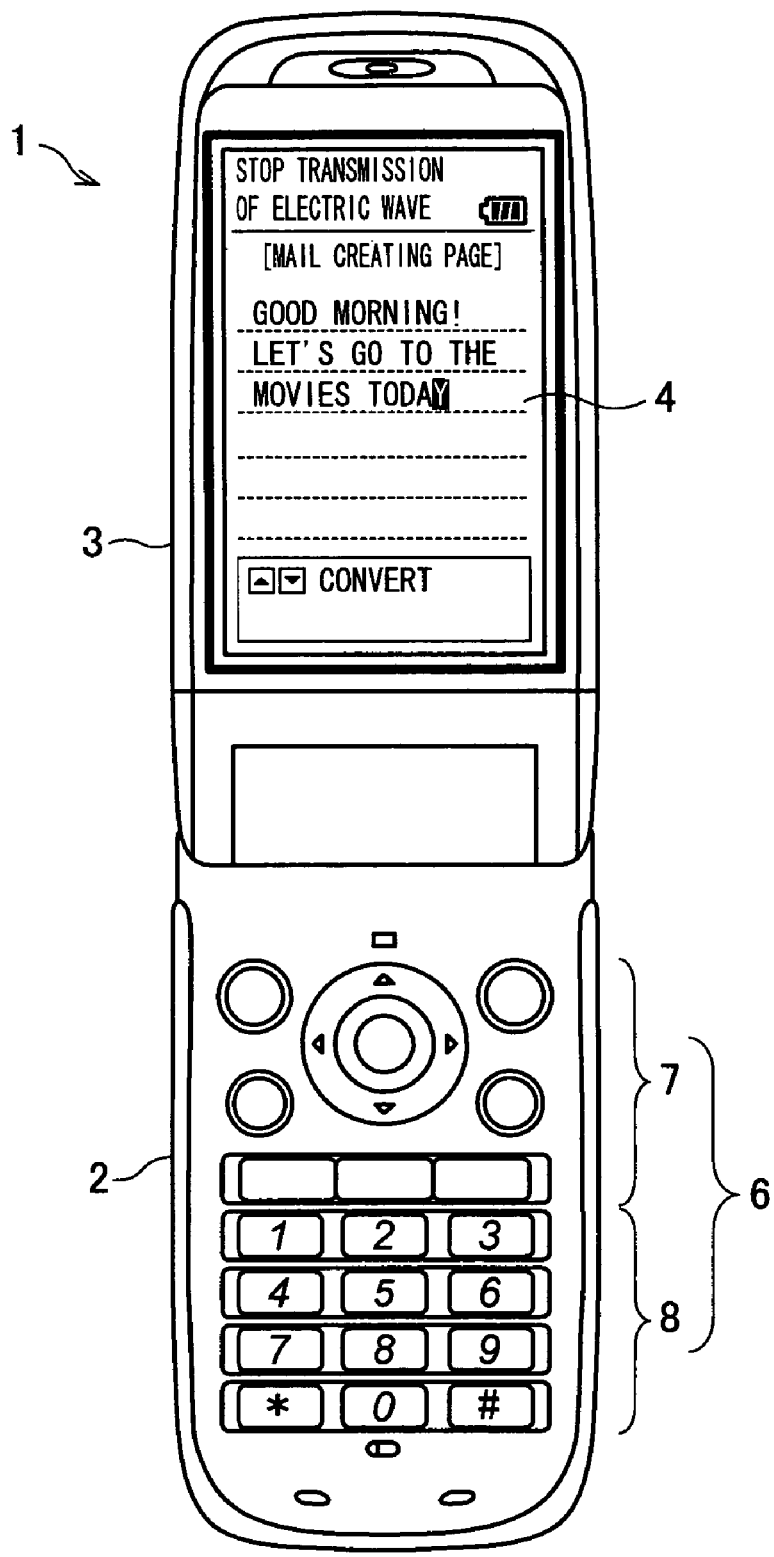
FIG. 7 is a diagram illustrating an exterior of the portable phone according to an embodiment of the present invention.

FIG. 7 illustrates an exterior of a portable phone (electronic device) 1 according to an embodiment of the present invention. The portable phone 1 of the present embodiment is so-called clamshell-type, and is illustrated in the figure in an open state. What illustrated in FIG. 7 is a face of the portable phone 1 that comes inside when the portable phone 1 is folded. A user mainly uses this face when using the portable phone 1 that is in an open state. Accordingly, the face illustrated in FIG. 7 will be referred to as a front face (upper face) in the present application.

As illustrated in FIG. 7, the portable phone 1 includes a main body 2 and a covering body 3. The main body 2 and the covering body 3 are connected by a hinge. The covering body 3 includes, on a front face side, a display section (display apparatus) 4.

The main body 2 includes, on a front face side, main operation-buttons 6. The main operation-buttons 6 include (i) function buttons 7 for switching functions and setting in the portable phone 1 and (ii) input buttons 8 for inputting a character such as a number and a text. Concretely, the function buttons 7 include: a power button for switching on/off a power source of the portable phone; a camera button for activating a photograph mode; a mail button for activating a mail mode; a cross button for moving a selected object upward, downward, leftward, and/or rightward; a select button, at the center of the cross button, for finalizing various selections. Further, the input buttons 8 are numeric keypads.

The portable phone (electronic device) 1 of the present invention includes a viewing-angle control function and a mirror function. Specifically, the portable phone 1 of the present invention allows switching the following three modes:

(A) a mode where, when the display section 4 displays a main image, such as a mail text and a picturized image, the main image displayed on the display section 4 is difficult to be observed from circumference;

(B) a mode where the main image displayed on the display section 4 is visible from any direction; and (C) a mode where the display section 4 is observed in a form of mirror-surface display.

Hereinafter, the mode (A) will be referred to as a narrow viewing-angle mode (narrow mode) or a privacy mode, the mode (B) will be referred to as a wide viewing-angle mode or a normal mode, and the mode (C) will be referred to as a mirror mode. Further, a combination of the modes (A) and (B) will be referred to as a viewing-angle control mode. These modes may be arbitrarily set or changed by the user via the operation button.

FIGS. 6(a) to 6(c) are diagrams illustrating the display section 4 in the case where the portable phone 1 is in the narrow viewing-angle mode. FIG. 6(a) is a diagram illustrating the display section 4 taken from the left on the observer's side (left side-face direction). FIG. 6(b) is a diagram illustrating the display section 4 taken from the front direction. FIG. 6(c) is a diagram illustrating the display section 4 taken from the right on the observer's side (right side-face direction). In other words, FIG. 6(a) and FIG. 6(c) are diagrams illustrating the display section 4 taken from oblique directions. In FIGS. 6(a) to 6(c), white portions are visible (visible region, transmissive region), whereas black portions (painted-out portions) are invisible (invisible region, light-shielding region).

As illustrated in FIGS. 6(a) to 6(c), during the narrow viewing-angle mode, all regions of the display section 4 are visible when the display section 4 is observed from the front direction, whereas there is a mixture of visible regions and invisible regions in the display section 4 when the display section 4 is observed from the right side-face direction or from the left side-face direction. In other words, during the narrow viewing-angle mode, all regions of the main image are visible from the front direction, whereas the main image is partially invisible from the right side-face direction and from the left side-face direction. Furthermore, the visible regions and the invisible regions are inverse in the cases where (i) the display section 4 is observed from the right side-face direction and (ii) the display section 4 is observed from the left side-face direction. Specifically, in comparison of FIGS. 6(a) and 6(c) where the display section 4 is observed from the right side-face direction and the left side-face direction, respectively, the visible regions and the invisible regions are inverse (negative-positive inversion). As such, during the narrow viewing-angle mode, black and white become inversed (negative-positive inversion) between (i) a pattern observed from the right and (ii) a pattern observed from the left. Note that such visible regions and invisible regions during the narrow viewing-angle mode are arranged by utilizing the alignment direction of TN liquid crystal in the liquid crystal layer 22 (see FIG. 1). This will be described below. Further, according to the present invention, each of the invisible regions is partially displayed in a form of the mirror-surface during the narrow viewing-angle mode. This significantly improves an effect of making the main image difficult to observe. This effect will be described in Embodiment 2.

On the other hand, during the wide viewing-angle mode, all regions of the display section 4 are visible from any direction. Accordingly, the main image on the display section 4 is visible from any direction. Further, the display section 4 is observed in the form of mirror-surface display from any direction during the mirror mode.

Figure 1:
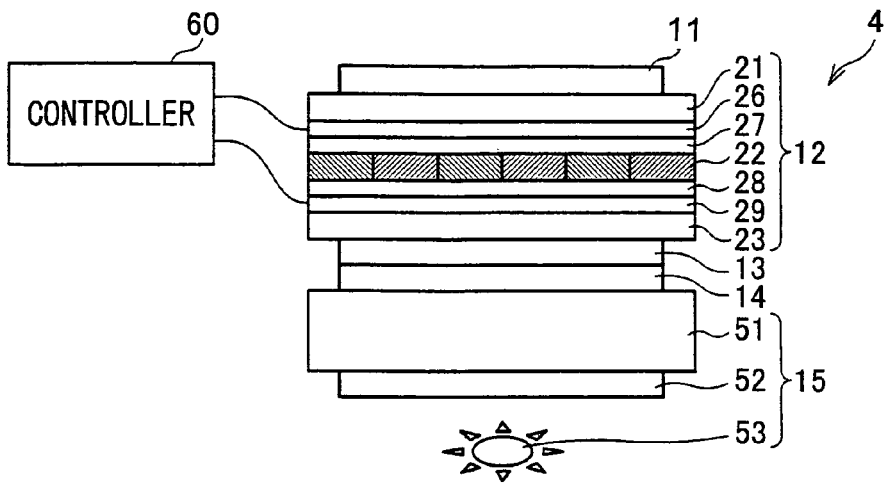
FIG. 1 is a cross-sectional diagram of a display section of a portable phone according to an embodiment of the present invention.

The following describes the display section 4 in detail. FIG. 1 is a cross-sectional diagram illustrating the display section 4.

As illustrated in FIG. 1, the display section 4 includes a first polarizer 11, a switching-panel section 12, a reflective polarizer 13, a second polarizer 14, and a main panel section (picture display section) 15. These components are arranged in the order as listed, starting from the front face.

In the switching-panel section 12, a pair of substrates 21 and 23 sandwich a liquid crystal layer 22, which acts as a display switching section. Specifically, the electrodes 26 and 29 (voltage (electric field) application section, voltage (electric field) application means) are formed on the substrates 21 and 23, respectively. Alignment layers 27 and 28 are formed on the electrodes 26 and 29. The liquid crystal layer 22 includes liquid crystal molecules of TN mode. The liquid crystal molecules of the liquid crystal layer 22 are twisted at 90° between the substrates 21 and 23. Further, the electrodes 26 and 29 are connected to a controller 60 (controlling means), which controls the switching-panel section 12. Note that the display switching section may be structured such that the liquid crystal layer 22 is sandwiched between a pair of substrates 21 and 23. In other words, the switching-panel section 12 may act as the display switching section.

Further, the liquid crystal layer 22 includes a plurality of regions having at least two different alignment directions. In other words, the liquid crystal layer 22 includes liquid crystal molecules with a variety of alignment directions. The alignment directions are differentiated by performing a rubbing process on the substrates 21 and 23, or more specifically, on the alignment layers 27 and 28, for example. This decides an initial alignment direction of the liquid crystal molecules. Then, the alignment direction of the liquid crystal molecules is changed in accordance with a voltage (intensity of electric field, or more concretely, intensity of voltage (including 0V, where no voltage is applied) applied to the electrodes 26 and 29) that is applied, via the electrodes 26 and 29, to the liquid crystal layer 22 by the controller 60. By changing the alignment direction, the mode is switched to the narrow viewing-angle mode, the wide viewing-angle mode, or the mirror mode that is selected by the user. Note that the alignment directions are differentiated by using the mask rubbing method, the light alignment layer method, the rib method and the like.

The reflective polarizer 13 (i) transmits a predetermined polarized-light component and (ii) reflects a polarized-light component that is orthogonal to the predetermined polarized-light component. Specifically, the reflective polarizer 13 includes (i) a polarized-light transmission axis and (ii) a polarized-light reflectance axis that is orthogonal to the polarized-light transmission axis, and has a function of reflecting polarized light that is parallel to the polarized-light reflectance axis. In other words, the reflective polarizer 13 acts as a polarized light selecting means for selecting an arbitrary polarized-light component.

In the present embodiment, a P-wave/S-wave separating film is used as the reflective polarizer 13. The P-wave/S-wave separating film is a lamination layer in which different birefringent polymeric films are laminated (see, for example, International Application Publication No. WO95/27919 pamphlet (published on Oct. 19, 1995)). Concrete example of the P-wave/S-wave separating film includes DBEF (product name) manufactured by 3M.

Further, the main panel section 15 includes a liquid crystal display section 51 and a third polarizer 52 in the order as listed, starting from the front face (upper side), that is, from the second polarizer 14 side. Note that, in the present embodiment, the liquid crystal display section 51 displays with the use of liquid crystal, and therefore a backlight 53 is provided under the third polarizer 52.

The controller 60 causes an application of voltage (electric field) so that orientation of the liquid crystal molecules of the liquid crystal layer (not illustrated) is changed. By this way, the liquid crystal display section 51 displays an image. The liquid crystal display section 51 is controlled by the controller 60 so as to display an image of the portable phone 1, such as an operation screen, a picture, and a mail text. A commonly-known liquid crystal display apparatus may be used as the liquid crystal display section 51. For example, any liquid crystal display apparatus, such as a TN (Twisted Nematic) liquid crystal display apparatus and a VA (Vertical Alignment) liquid crystal display apparatus, both of which are driven by an active matrix driving method, may be used.

Note that the backlight 53 supplies light that is necessary for displaying. A self-illuminating display, such as an organic light EL (Electro Luminescence) display apparatus and a plasma display apparatus, may be used in place of the liquid crystal display section 51. In the case where a self-illuminating display is used, no backlight 53 is necessary.

The first polarizer 11 extracts linear polarized-light of a predetermined direction from outside light before the outside light enters the switching-panel section 12. The reflective polarizer 13 (i) extracts linear polarized-light of a predetermined direction from the light that has transmitted through the switching-panel section 12, and (ii) reflects linear polarized-light that is perpendicular to this predetermined direction. The second polarizer 14 extracts, linear polarized-light of a predetermined direction from the light that has transmitted through the switching-panel section 12 and the reflective polarizer 13, before the light enters the main panel section 15. The third polarizer 52 extracts linear polarized-light of a predetermined direction from the light supplied by the backlight 53, before the light enters the liquid crystal display section 51.

In the present embodiment, the first polarizer 11 is affixed to the switching-panel section 12, and the second polarizer 14 and the third polarizer 52 are affixed to both surfaces of the liquid crystal display section 51, respectively. Furthermore, (i) a face of the switching-panel section 12, which face the first polarizer 11 is not affixed to, and (ii) a face of the second polarizer 14, which face the main panel section 15 is not affixed to, sandwich the reflective polarizer 13 and are bonded.

The following describes the switching of the three modes described above. What important in switching the three modes are (i) orientation of the liquid crystal molecules of the liquid crystal layer 22 and (ii) a polarized-light axis of the first polarizer 11, a polarized-light axis of the reflective polarizer 13, and a polarized-light axis of the second polarizer 14. This will be described in the following by referring to the polarized-light transmission axis of the reflective polarizer 13.

Figure 2:
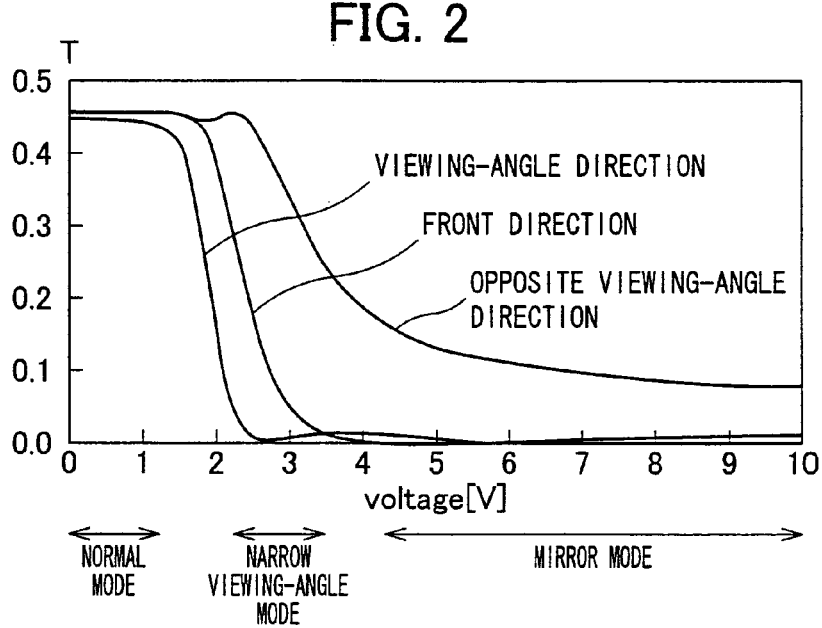
FIG. 2 is a graph showing voltage-transmittance characteristics of a TN liquid crystal.
Figure 3:
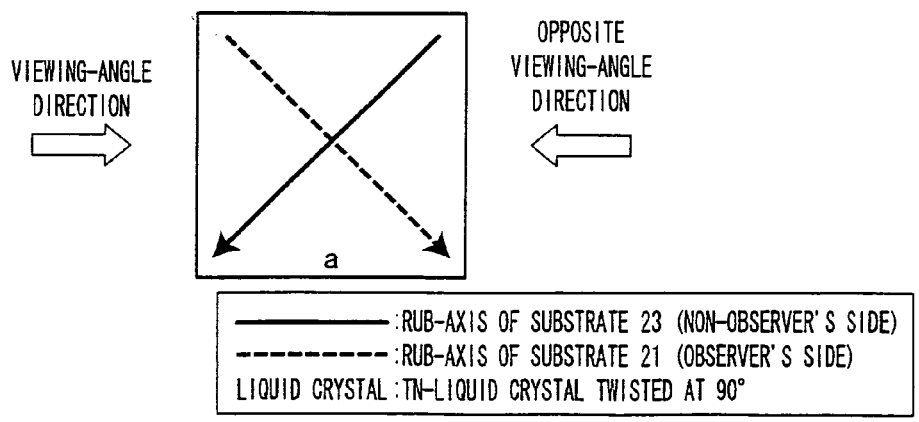
FIG. 3 is a diagram illustrating (i) a viewing-angle direction and (ii) an opposite viewing-angle direction in the graph of FIG. 2.

FIG. 2 is a graph showing voltage(V)-transmittance(T) characteristics. FIG. 3 is a diagram illustrating an alignment direction of the liquid crystal molecules in region-a of the liquid crystal layer 22. FIG. 4 is a diagram illustrating a distribution of orientations of the liquid crystal molecules of the liquid crystal layer 22. FIG. 5 is a diagram illustrating (i) alignment directions (a rubbing direction of the upper substrate 21, and a rubbing direction of the lower substrate 23; in FIG. 5, they are referred to as a RUB-axis of the substrate 21, and a RUB-axis of the substrate 23, respectively) in the region-a and region-b of the liquid crystal layer 22, (ii) a polarized-light transmission axis (in FIG. 5, this is referred to as a polarized light axis of the first polarizer 11) of the first polarizer 11, and (iii) a polarized-light transmission axis (in FIG. 5, this is referred to as a polarized light axis of the second polarizer 14) of the second polarizer 14 (or reflective polarizer 13).

As illustrated in FIG. 4, in the present embodiment, the liquid crystal layer 22 includes the region-a and the region-b that are different in alignment directions of the liquid crystal molecules. The region-a and the region-b are provided alternately so that different regions are adjacently provided.

As illustrated in FIGS. 3 and 5, with regard to the region-a of the liquid crystal layer 22, a rubbing process is performed on the upper substrate 21 and the substrate 23, which is on the lower part, so as to decide the orientation of the liquid crystal molecules. In FIG. 3, the broken line indicates a rubbing direction (rubbing axis) of the substrate 21, whereas the continuous line indicates a rubbing direction of the substrate 23. In FIG. 3, the rubbing directions of the substrates 21 and 23 are orthogonal to each other, and the alignment direction of the liquid crystal molecules is twisted at 90°.

Further, as illustrated in FIG. 5, the rubbing directions of the substrates 21 and 23 in the region-b are directly opposite to the rubbing directions in the region-a. Furthermore, as also illustrated in FIG. 5, the rubbing direction of the substrate 21 is orthogonal to the polarized-light transmission axis (the polarized light axis of the second polarizer 14 in FIG. 5) of the reflective polarizer 13, whereas the rubbing direction of the substrate 23 is parallel to the polarized-light transmission axis (the polarized light axis of the second polarizer 14 in FIG. 5) of the reflective polarizer 13. Further, in the present embodiment, the polarized-light transmission axis of the first polarizer 11 is orthogonal to the polarized-light transmission axis of the reflective polarizer 13, whereas the polarized-light transmission axis of the second polarizer 14 is parallel to the reflective polarizer 13. With this arrangement, the display apparatus becomes normally-white.

In this case, a transmittance of the region-a illustrated in FIG. 3 differs, according to a voltage (electric field) that is applied, in (i) a front direction, (ii) a viewing-angle direction, which is on the left side direction with respect to the front direction, and (iii) an opposite viewing-angle direction, which is opposite to the viewing-angle direction (i.e., the right side direction with respect to the front direction). The liquid crystal molecules of the liquid crystal layer 22 have a viewing-angle property corresponding to the voltage (electric field) that is applied.

More specifically, as illustrated in FIG. 2, in the case where a voltage of less than 2V is applied to the switching-panel section 12, the transmittance is high in any direction. Accordingly, the image of the main panel section 15 is visible from all directions. Therefore, the wide viewing-angle mode (normal mode) is realized in this region.

On the other hand, in the case where a voltage of approximately 2V to 3V is applied, the transmittance is higher in the front direction than in the viewing-angle direction, and higher in the opposite viewing-angle direction than in the front direction. The difference in the transmittances is significant especially between the viewing-angle direction and the opposite viewing-angle direction. The reason therefore is that the voltage applied to the switching-panel section 12 (specifically, a voltage applied to the electrodes 26 and 29 via which an electric field is applied to the liquid crystal layer 22 of the switching-panel section 12) causes a change in the alignment direction of the liquid crystal molecules (the liquid crystal molecules are slightly risen, compared to those during the wide viewing-angle mode). This causes the region-a to become (i) invisible (difficult to be observed) from the viewing-angle direction but (ii) visible from the opposite viewing-angle direction. Note that, as illustrated in FIG. 5, the rubbing directions of the substrates 21 and 23 in the region-a are opposite to the rubbing directions in the region-b. Accordingly, the region-a and the region-b are observed in opposite ways. In other words, the region-b is (i) visible from the viewing-angle direction but (ii) invisible (difficult to be observed) from the opposite viewing-angle direction. Thus, the region-a and the region-b become visible or invisible depending upon the direction from which they are observed.

Accordingly, as illustrated in FIGS. 6(a) and 6(c), during the narrow viewing-angle mode, the image on the main panel section 15 is observed in opposite ways (i) when observed from the right side direction with respect to the front direction and (ii) when observed from the left side direction with respect to the front direction.

Further, as illustrated in FIG. 2, the transmittance is low in any direction in the case where a voltage of 3V or greater is applied to the region. In other words, the image on the main panel section 15 becomes invisible (difficult to be observed) from any direction. Such region is set at the mirror mode. In the mirror mode, light would not be twisted at 90° in the liquid crystal layer 22. Furthermore, the polarized-light transmission axes of the first polarizer 11 and the reflective polarizer 13 are orthogonal to each other. In other words, the polarized-light transmission axis of the first polarizer 11 and the polarized-light reflectance axis of the reflective polarizer 13 are parallel to each other. Accordingly, the light transmitted through the liquid crystal layer 22 is reflected by the reflective polarizer 13. This makes it possible to realize mirror-surface display.

Table 1 shows an example of (i) a voltage applied to the switching-panel section 12, (ii) status of lighting of the backlight 53, and (iii) status of display, in the respective three modes described above.

TABLE 1

|  | NORMAL MODE | NARROW VIEWING-ANGLE MODE | MIRROR MODE |
| --- | --- | --- | --- |
| SWITCHING PANEL SECTION | 0 V | 2 V | 5 V |
| BACKLIGHT STATUS | ON | ON | OFF |
| OF DISPLAY | DISPLAY IMAGE OF MAIN PANEL SECTION AT WIDE VIEWING-ANGLE | DISPLAY IMAGE OF MAIN PANEL SECTION AT NARROW VIEWING-ANGLE | MIRROR IS DISPLAYED, AND WHAT DISPLAYED ON MAIN PANEL SECTION IS INVISIBLE |

In the wide viewing-angle mode (normal mode), a voltage of 0V (no voltage is applied) or a voltage that is less influential to the viewing-angle property (for example, as shown in FIG. 2, a voltage by which a transmittance that is approximately the same, or preferably the same, as the transmittance in the case where no voltage is applied is obtained (specifically, a voltage of 0V or greater and lower than 2V, preferably 1.5V or lower)) is applied to the switching-panel section 12. After emitted from the backlight 53, light transmits through the main panel section 15, passes through the second polarizer 14 and the reflective polarizer 13, is twisted at 90° in the liquid crystal layer 22, and then exits from the first polarizer 11 toward an observer. As such, the viewing-angle is not controlled (limited), and therefore the image on the main panel section 15 is displayed in such a way as to be visible from any direction.

Further, in the case where a voltage of approximately 2V to 3V (2V in Table 1) is applied to the switching panel section 12 during the narrow viewing-angle mode, the liquid crystal molecules are slightly tilted, compared to those during the wide viewing-angle mode. The transmittance in the viewing-angle direction and the transmittance in the opposite viewing-angle direction are different, and therefore there is a difference in their luminances. This causes (i) light in the viewing-angle direction to be shielded (black) and (ii) light in the opposite viewing-angle direction to be transmitted. As such, in the case where the region-a and the region-b, which are exactly opposite in the alignment directions, are alternately provided as the way illustrated in FIG. 4, a scrambled image is observed when the display section 4 is observed from an oblique direction (lateral direction).

Further, during the mirror mode, if a high voltage (5V in Table 1) is applied, polarized light entered from the first polarizer 11 is reflected by the reflective polarizer 13. As such, mirror-surface display is realized. It is preferable in the mirror mode that the backlight 53 be turned off, or the backlight 53 and the main panel section 15 be turned off, in order to enhance the effect of mirror.

As described above, in the case of the normally-white type, (a) the voltage causing the liquid crystal layer to be switched to the mirror mode is set greater than (b) the voltage causing the liquid crystal layer to be switched to the narrow viewing-angle mode, and (b) the voltage causing the liquid crystal layer to be switched to the narrow viewing-angle mode is set greater than (c) the voltage causing the liquid crystal layer to be switched to the wide viewing-angle mode. Further, it is possible to save electric power by setting the voltage for executing one of the three modes, preferably the wide viewing-angle mode, at 0V.

Further, in the present embodiment, (b) the voltage causing the liquid crystal layer to be switched to the narrow viewing-angle mode is set more proximate to (c) the voltage causing the liquid crystal layer to be switched to the wide viewing-angle mode, than to (a) the voltage causing the liquid crystal layer to be switched to the mirror mode. Therefore, a tilt of the liquid crystal molecules of the liquid crystal layer 22 due to application of voltage becomes proximate to a tilt of the liquid crystal molecules in the wide viewing-angle mode. Accordingly, the viewing-angle property becomes greater, as shown in FIG. 2. Therefore, it becomes possible to make an image on the display section 4 difficult to observe especially from an oblique direction during narrow viewing-angle mode.

Note that the voltage to be applied is not limited to a particular voltage, and may be set depending upon the type of the liquid crystal molecules of the liquid crystal layer 22.

Further, a liquid crystal display is adopted as the main panel section 15 in the present embodiment, but the backlight 53 is unnecessary in the case where the main panel section 15 is realized by a self-illuminating type display. In this case, as illustrated in Table 2, the effect of mirror can be enhanced in the same manner by turning off the main panel section 15.

TABLE 2

| | NORMAL MODE | NARROW VIEWING-ANGLE MODE | MIRROR MODE |
|---|---|---|---|
| SWITCHING PANEL SECTION | 0 V | 2 V | 5 V |
| MAIN PANEL SECTION | ON | ON | OFF |
| STATUS OF DISPLAY | IMAGE OF MAIN PANEL SECTION IS DISPLAYED AT WIDE VIEWING-ANGLE | IMAGE OF MAIN PANEL SECTION IS DISPLAYED AT NARROW VIEWING-ANGLE | MIRROR IS DISPLAYED, AND WHAT DISPLAYED ON MAIN PANEL SECTION IS INVISIBLE |

Note that, in the present embodiment, the second polarizer 14 functions as a polarizer for both of the switching-panel section 12 and the main panel section 15. The reason therefore is that a property of the main panel section 15 is parallel to the polarized-light transmission axis of the reflective polarizer 13. The property of the main panel section 15, however, differs depending upon the main panel section 15. In other words, there is a possibility that the second polarizer 14 may have, in accordance with a requested property of the main panel section 15, an arbitrary axial angle with respect to the polarized-light transmission axis of the reflective polarizer 13.

In this case, another polarizer is provided on a front face of the second polarizer 14 in such a way as to be parallel to the polarized-light transmission axis of the reflective polarizer 13. Further, in the case where the polarized-light transmission axis of the second polarizer 14 is not parallel to the transmission axis of that another polarizer described above, a direction of polarized light is rotated in such a way as to conform to the polarized-light transmission axis of the reflective polarizer 13 with the use of, for example, a λ/2 plate, when necessary. As such, it becomes possible to obtain the same effect as that in the case where the polarized-light transmission axis of the reflective polarizer 13 is set parallel to the polarized-light transmission axis of the second polarizer 14.

As described above, according to the present embodiment, three kinds of voltages are set: a voltage for executing the narrow viewing-angle mode; a voltage for executing the wide viewing-angle mode; and a voltage for executing the mirror mode. The controller 60 applies, via the electrodes 26 and 29, a voltage (more precisely, an electric field according to the voltage) to the switching-panel section 12 (liquid crystal layer 22), which voltage is predetermined for the respective modes. This makes it possible to switch the narrow viewing-angle mode, the wide viewing-angle mode, and the mirror mode. In other words, it becomes possible to realize a portable phone that allows switching the viewing-angle control function, and the mirror function.

Note that, although the normally-white type display apparatus is described in the present embodiment, the present invention is applicable to a normally-black type display apparatus. A structure of the normally-black type display apparatus is different from the structure of the normally-white type display apparatus in that, in the normal state (state where no voltage is applied), the alignment direction of the substrate 23, which is at a lower position, is provided in such a way as to be orthogonal to the polarized-light transmission axis of the reflective polarizer 13. In the case of the normally-black type display apparatus, the mirror mode is executed while no voltage is applied. In other words, the portable phone 1 may be normally used as a mirror, and the viewing-angle control mode may be executed when necessary. Therefore, this structure is preferable for female users who have more opportunities to use a mirror for the purpose of, for example, checking make-up or hair-style. In other words, the structure of normally-black is preferable in the case where a value is placed on the mirror function rather than on the viewing-angle control function.

On the other hand, the structure of normally-white is preferable in the case where a value is placed on the viewing-angle control function (especially the narrow viewing-angle mode) rather than on the mirror function. The following describes the reason therefore.

In both cases of normally-white and normally-black, the liquid crystal molecules of the liquid crystal layer 22 are lain with respect to the substrates 21 and 23 (state in which the liquid crystal molecules are parallel, or substantially parallel, to a face of the substrate) during the normal state (state in which no voltage is applied). In these cases, there is little difference between (i) how the liquid crystal molecules are observed from the viewing-angle direction and (ii) how the liquid crystal molecules are observed from the opposite viewing-angle direction. Furthermore, there is little difference between (i) a refractive index of the liquid crystal molecules in the viewing-angle direction and (ii) a refractive index of the liquid crystal molecules in the opposite viewing-angle direction.

In the case of normally-white, a voltage of approximately 2V to 3V (voltage that is close to the voltage applied during the wide viewing-angle mode) is applied to the liquid crystal layer 22 during the narrow viewing-angle mode. This causes the liquid crystal molecules to slightly rise, compared to those during the wide viewing-angle mode (normal state). Therefore, there is a significant difference between (i) how the liquid crystal molecules are observed from the viewing-angle direction and (ii) how the liquid crystal molecules are observed from the opposite viewing-angle direction. Furthermore, (i) the refractive index of the liquid crystal molecules in the viewing-angle direction and (ii) the refractive index of the liquid crystal molecules in the opposite viewing-angle direction differ significantly. In other words, the degree of the twist of apparent liquid crystal molecules is large in the case where observation is made from the viewing-angle direction (light-shielding direction) during the narrow viewing-angle mode. Thus, the transmittance in the viewing-angle direction significantly decreases as shown in FIG. 2 described above, and therefore the viewing-angle control function (shielding effect of main image) is enhanced.

On the other hand, in the case of normally-black, a voltage of approximately 3V to 4V (voltage that is proximate to the voltage applied during the wide viewing-angle mode) is applied to the liquid crystal layer 22 in order to execute the narrow viewing-angle mode. This causes the liquid crystal molecules to rise significantly, compared to those during the wide viewing-angle mode (normal state). Therefore, there is little difference between (i) how the liquid crystal molecules are observed from the viewing-angle direction and (ii) how the liquid crystal molecules are observed from the opposite viewing-angle direction. Furthermore, (i) the refractive index of the liquid crystal molecules in the viewing-angle direction and (ii) the refractive index of the liquid crystal molecules in the opposite viewing-angle direction do not differ significantly. In other words, the degree of the twist of apparent liquid crystal molecules is small in the case where observation is made from the viewing-angle direction (light-shielding direction) during the narrow viewing-angle mode. For this reason, the viewing-angle control function is not enhanced as greatly as in the case of normally-white.

Accordingly, the structure of normally-white is preferable in the case where a value is placed on the viewing-angle control function (especially the narrow viewing-angle mode).

Note that, although it is described in the present embodiment that the present invention is applied to the display section 4 of the portable phone 1, application of the present invention is not limited thereto, and the present invention is applicable to a portable electronic device including a display apparatus, such as a mobile PC, an AV device, and a DVD player. Furthermore, the present invention may be applied to a non-portable display apparatus so that the non-portable display is used as a display that can display differently depending upon a direction from which the display is observed.

Embodiment 2

The following describes another embodiment of the present invention, with reference to FIGS. 8 to 14. In the following description of the present embodiment, reference will be made, when necessary, to FIGS. 1 to 7, which were used in the description of Embodiment 1. Note that, in the following description, mainly differences between the present embodiment and Embodiment 1 will be described, and description of common points is omitted.

Embodiment 1 described the portable phone 1 with three modes, the viewing-angle control function (narrow viewing-angle mode and wide viewing-angle mode) and the mirror function (mirror mode). In the present invention, however, the portable phone 1 may function as a portable phone without the mirror mode.

Thus, in the present embodiment, the portable phone 1 with the viewing-angle control function will be described. The basic structure of the portable phone 1 according to the present embodiment is same as that of the portable phone 1 according to Embodiment 1. Furthermore, the structure of the display section 4, which structure is a feature of the present invention, is the same as that illustrated in FIG. 1. The present embodiment is different from Embodiment 1 in that the portable phone 1 according to the present invention does not have the mirror mode.

According to the present embodiment, a voltage of 0V (no voltage applied) or a voltage that does not largely impact on the viewing-angle property is applied to the switching-panel section 12 during the wide viewing-angle mode (normal mode), in the same manner as in Embodiment 1.

On the other hand, a voltage of approximately 2V is applied to the switching panel section 12 during the narrow viewing-angle mode. As such, the liquid crystal molecules become slightly tilted (intermediate tone display), compared to those during the wide viewing-angle mode.

This makes it possible to enhance a peek-prevention effect from an oblique direction with respect to a main image displayed on the display section 4.

This will be described in the following, with reference to FIGS. 8(a), 8(b), 9(a), 9(b), 10(a), and 10(b). FIGS. 8(a), 8(b), 9(a), 9(b), 10(a), and 10(b) are diagrams each schematically illustrating (i) the transmissive regions, (ii) the light-shielding regions, and (iii) the mirror-surface display regions of the display section of the portable phone according to an embodiment of the present invention during the narrow viewing-angle mode. FIG. 8(a) is a diagram illustrating the display section in the case where the display section is observed from the lower left corner, and FIG. 8(b) is a diagram illustrating the display section in the case where the display section is observed from the left (just beside). FIG. 9(a) is a diagram illustrating the display section in the case where the display section is observed from the lower right corner, and FIG. 9(b) is a diagram illustrating the display section in the case where the display section is observed from the right (just beside).

Note that, in these figures, transmissive regions TR are regions (visible region, transmissive region) where the image displayed on the liquid crystal display section 51 is transmitted and therefore is visible. Further, light-shielding regions B are regions (invisible region) where light is shielded so that the image displayed on the liquid crystal display section 51 is displayed in black. Finally, mirror-surface display regions M are regions where light is reflected by the reflective polarizer 13.

As shown in these figures, a border between the transmissive region TR and the light-shielding region B in the viewing direction is the mirror-surface display region M.

FIGS. 8(a) and 9(a) are diagrams schematically illustrating (i) the transmissive regions, (ii) the light-shielding region and (iii) the mirror-surface display regions of the display section 4 observed from an oblique direction during the narrow viewing-angle mode. In the case where a light-shielding region B in the figures is targeted, the following regions are observed: a transmission region TR on the upper side of the light-shielding region B; a transmission region TR on the right side of the light-shielding region B (FIG. 8(a)), or a transmission region TR on the left side of the light-shielding region B (FIG. 9(a)); a light-shielding region B in the upper right direction of the light-shielding region B (FIG. 8(a)) or a light-shielding region B in the upper left direction (FIG. 9(a)) of the light-shielding region B. A boundary between a light-shielding region B and the transmissive region TR becomes a mirror-surface display region M. A portion surrounded by the mirror-surface display region M (corner section (portion that is formed at a corner of a square region formed by four adjacent transmission regions TR surrounding the square region, which corner is close to a point where two mirror-surface display regions M contained in the square region are in contact) becomes light-shielding region B.

FIGS. 8(b) and 9(b) are diagrams schematically illustrating (i) the transmissive regions, (ii) the light-shielding regions and (iii) the mirror-surface display regions of the display section 4 observed from just beside during the narrow viewing-angle mode. In the case where a light-shielding region B is targeted, the following regions are observed: a transmission region TR on the right side of the light-shielding region B (FIG. 8(b)); and a transmission region TR on the left side of the light-shielding region B (FIG. 8(b)). A border between a light-shielding region B and the transmissive region TR is the mirror-surface display region M. In other words, in FIG. 8(b), a side (part) of the light-shielding region B, which side is adjacent to a transmissive region TR that is on the right side, becomes a border and therefore becomes a mirror-surface display region M. Furthermore, in FIG. 9(b), a side (part) of the light-shielding region B, which side is adjacent to a transmissive region TR that is on the left side, becomes a border and therefore becomes a mirror-surface display region M.

The following describes one mechanism that a part of the light-shielding region B becomes the mirror-surface display region M, with reference to FIGS. 10(a) and 10(b). FIG. 10(a) is a cross sectional diagram of the display section 4, which diagram illustrates an exemplary mechanism of the mirror-surface display in the case where the display section 4 is observed from a right direction. FIG. 10(b) is a cross sectional diagram of the display section 4, which diagram illustrates an exemplary mechanism of the mirror-surface display in the case where the display section 4 is observed from a left direction. In these figures, the part of the liquid crystal layer 22, which part is indicated by the broken lines, is the region-a (see FIGS. 3, 4, and 5), whereas the part of the liquid crystal layer 22, which part is indicated by the continuous line, is the region-b (see FIGS. 3, 4, and 5).

As described above, the polarized-light transmission axis of the first polarizer 11 is orthogonal to the polarized-light transmission axis of the reflective polarizer 13. Furthermore, (i) the alignment direction in the region-a of the liquid crystal layer 22, which includes the TN liquid crystal, is directly opposite to (ii) the alignment direction in the region-b of the liquid crystal layer 22, which includes the TN liquid crystal.

For this reason, as illustrated in FIG. 10(a), light (outside light) that has entered from a left oblique direction and transmitted through the first polarizer 11 is twisted at 90° in the region-a of the liquid crystal layer 22, and then is transmitted through the reflective polarizer 13, in the case where the display section 4 is observed from the right direction. Accordingly, the light entered into the region-a transmits.

Further, light (outside light) that has entered from a left oblique direction and transmitted through the first polarizer 11 is transmitted through the region-b of the liquid crystal layer 22 without being twisted at 90° therein. Therefore, the light is reflected by the reflective polarizer 13. The light thus reflected is twisted at 90° in the region-b of the liquid crystal layer 22. The light thus twisted at 90°, however, cannot transmit through the first polarizer 11. Accordingly, the light that enters into the region-b and is reflected toward the region-b is shielded.

Further, if light that (i) transmits through the region-b of the liquid crystal layer 22 and (ii) is reflected by the reflective polarizer 13 is reflected through the region-a of the liquid crystal layer 22, then the light is transmitted through the region-a of the liquid crystal layer 22 without being twisted at 90° therein. The light thus transmitted through the region-a of the liquid crystal layer 22 transmits through the first polarizer 11. As described above, if light that transmits through the region-b of the liquid crystal layer 22 and is reflected by the reflective polarizer 13 transmits through the region-a of the liquid crystal layer 22, the light thus reflected would not be twisted at 90° in the region-a of the liquid crystal layer 22. For this reason, the light transmits through the first polarizer 11 and is observed. The light thus observed is the light reflected by the reflective polarizer 13. Accordingly, the light that transmits through the region-b of the liquid crystal layer 22 is reflected through the region-a of the liquid crystal layer 22 so that the mirror-surface display region M is formed. In other words, the outside light that transmits through the region-b is reflected by the reflective polarizer 13 and transmitted through the region-a so that the light is observed as shining light as though it is a mirror-surface.

The case where the display section 4 is observed from the left direction, which case is illustrated in FIG. 10(b), is same as the case illustrated in FIG. 10(a), except that the way it is observed is opposite, compared to the case where the observation is made from the right direction. Specifically, the light (outside light) that transmits through the first polarizer 11 and enters into the region-b from the right oblique direction is twisted at 90° in the region-b of the liquid crystal layer 22, and then transmits through the reflective polarizer 13.

Further, the light (outside light) that transmits through the first polarizer 11 and enters into the region-a from the right oblique direction is not twisted at 90° in the region-a of the liquid crystal layer 22. For this reason, the light is reflected by the reflective polarizer 13. The light thus reflected is twisted at 90° in the region-a of the liquid crystal layer 22. The light thus twisted at 90°, however, cannot transmit through the first polarizer 11. Accordingly, the light that enters into the region-a and is reflected toward the region-a is shielded.

Further, if light that (i) transmits through the region-a of the liquid crystal layer 22 and (ii) is reflected by the reflective polarizer 13 is reflected through the region-b of the liquid crystal layer 22, the light transmits through the region-b of the liquid crystal layer 22 without being twisted in the region-b. The light thus transmitted through the region-b of the liquid crystal layer 22 transmits through the first polarizer 11 and then is observed. The light thus observed is the light reflected by the reflective polarizer 13. Accordingly, the light that transmits through the region-a of the liquid crystal layer 22 is reflected through the region-b of the liquid crystal layer 22 so that the mirror-surface display region M is formed. In other words, the outside light that transmits through the region-a is reflected by the reflective polarizer 13 through the region-b. As such, the light is observed in a form of shining light as though it is a mirror-surface.

As described above, in the present embodiment, a part of the region (invisible region) of a main image, which region is made invisible due to the orientation of the liquid crystal layer 22, is made to be the mirror-surface display region M during the narrow viewing-angle mode. This makes it significantly difficult for the main image to be observed (or makes the main image invisible). The reason therefore is that the difference in contrast between the mirror-surface display region M and the light-shielding region B increases, and therefore it becomes difficult for the transmissive region TR to be observed.

Figure 8:
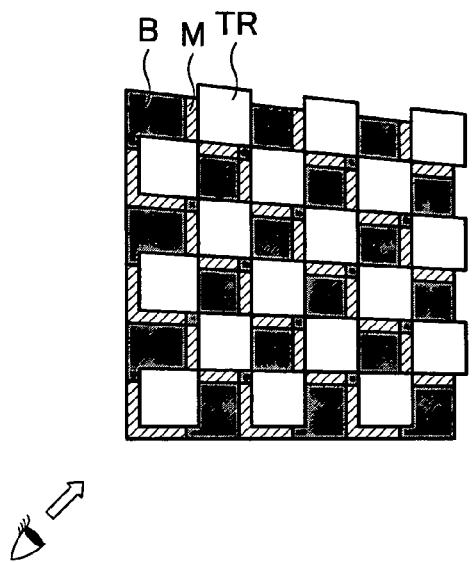
FIG. 8(a) is a diagram schematically illustrating (i) transmissive regions, (ii) light-shielding regions, and (iii) mirror-surface display regions of the display section taken from the left side at the bottom, in the case where the portable phone according to an embodiment of the present invention is in the narrow viewing-angle mode.
FIG. 8(b) is a diagram schematically illustrating (i) transmissive regions, (ii) light-shielding regions, and (iii) mirror-surface display regions of the display section taken from the left side, in the case where the portable phone according to an embodiment of the present invention is in the narrow viewing-angle mode.
Figure 8:
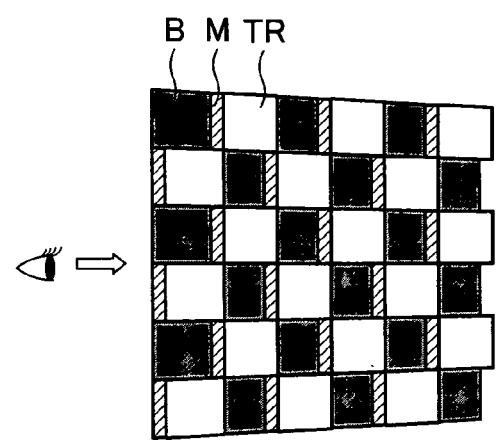
Figure 9:
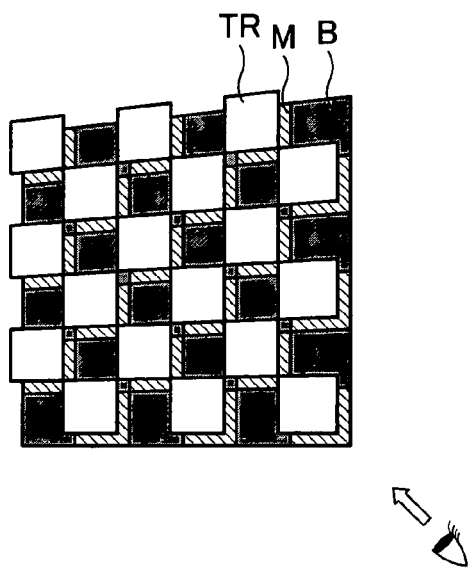
FIG. 9(a) is a diagram schematically illustrating (i) transmissive regions, (ii) light-shielding regions, and (iii) mirror-surface display regions of the display section taken from the right side at the bottom, in the case where the portable phone according to an embodiment of the present invention is in the narrow viewing-angle mode.
FIG. 9(b) is a diagram schematically illustrating (i) transmissive regions, (ii) light-shielding regions, and (iii) mirror-surface display regions of the display section taken from the right side, in the case where the portable phone according to an embodiment of the present invention is in the narrow viewing-angle mode.
Figure 9:
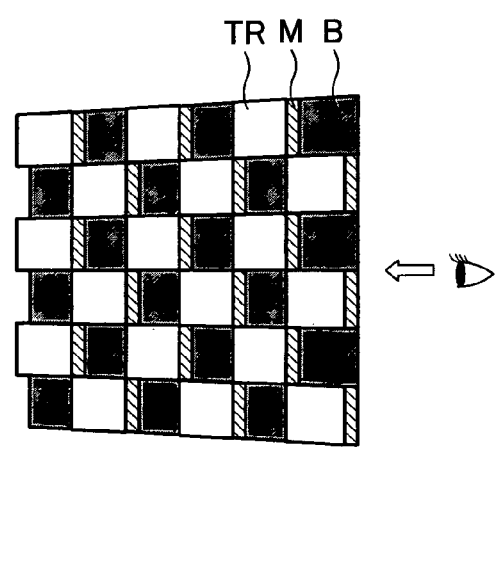
Figure 11:
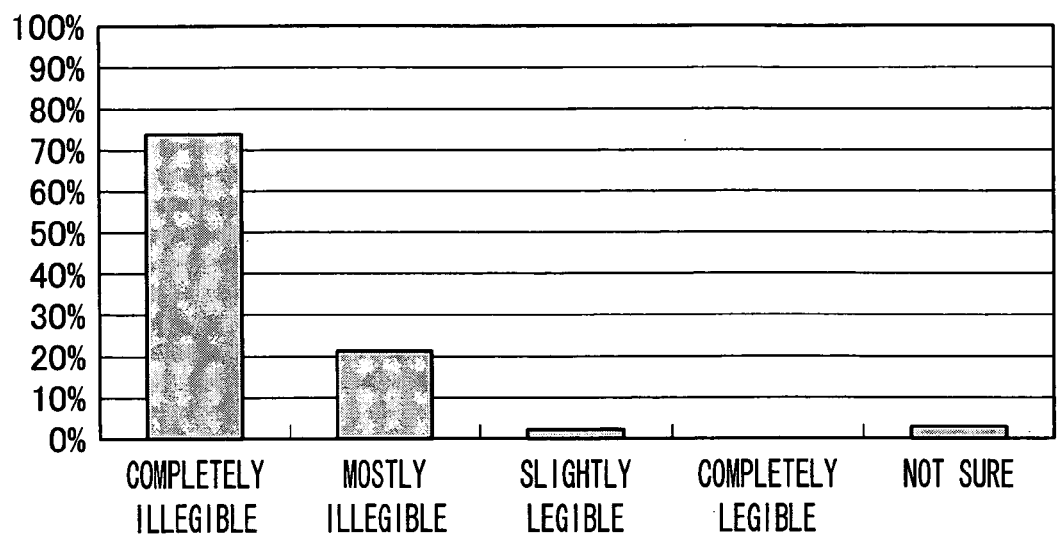
FIG. 11 is a graph showing results of evaluation of a peek-prevention effect of the portable phone according to an embodiment of the present invention.
Figure 12:
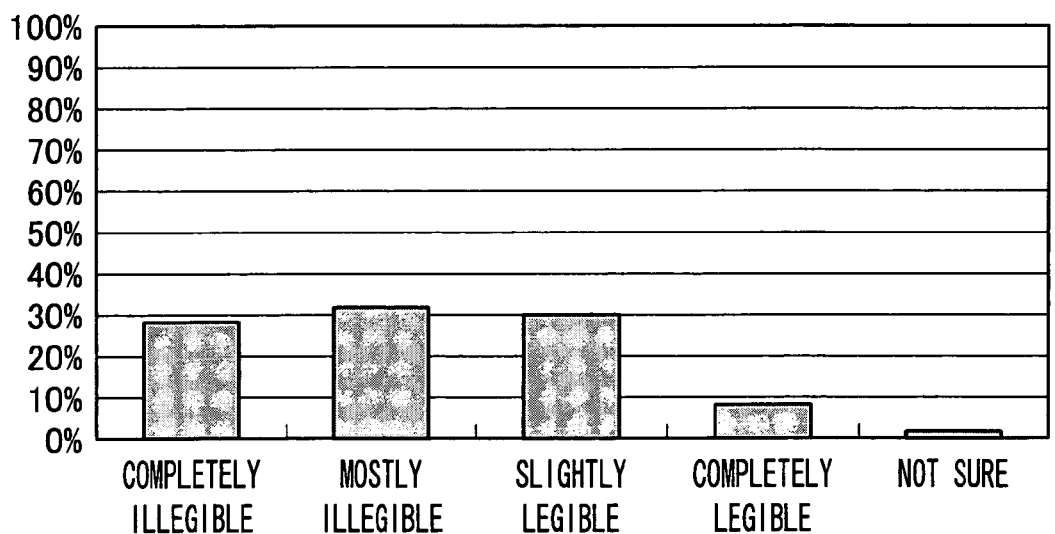
FIG. 12 is a graph showing results of evaluation of a peek-prevention effect of the portable phone according to Patent Document 1.

Note that the structure of Embodiment 1 is the same as that of the present embodiment, and therefore, certainly, the display section 4 is observed in the way as illustrated in FIGS. 8(*a*), 8(*b*), 9(*a*), and 9(*b*), during the narrow viewing-angle mode.

Figure 13:
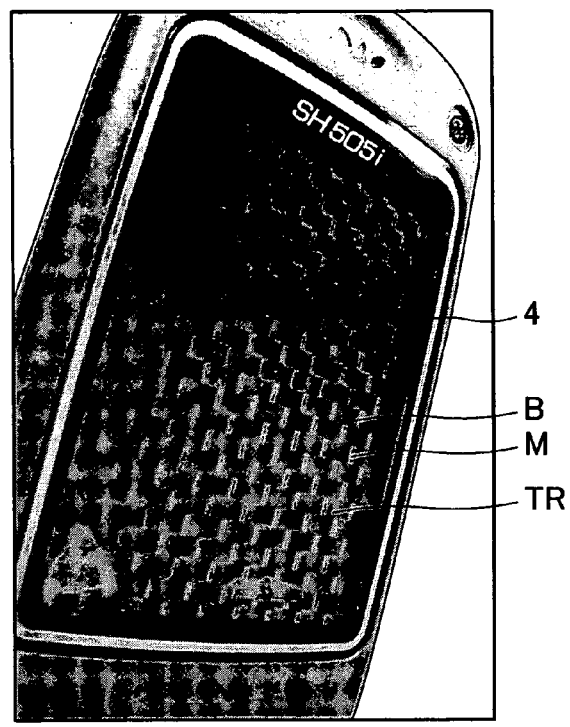
FIG. 13 is a diagram illustrating a main image that is displayed on the display section in the case where the portable phone according to an embodiment of the present invention is in the narrow viewing-angle mode.
Figure 14:
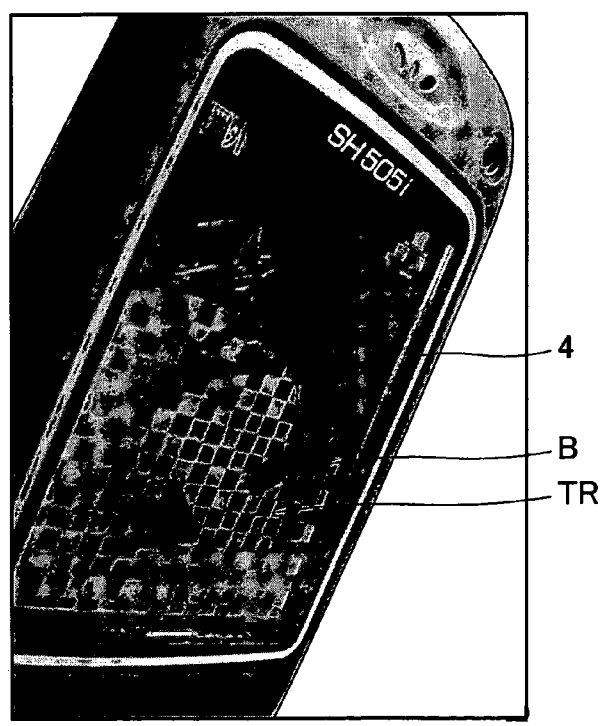
FIG. 14 is a diagram illustrating a main image that is displayed on the display section of the portable phone according to Patent Document 1.

FIG. 13 is a diagram illustrating a main image on the display section according to the present embodiment, during the narrow viewing-angle mode. FIG. 14 is a diagram illustrating a main image on the display section according to Patent Document 1, during the narrow viewing-angle mode. It is apparent from the figures that the main image on the display section according to the present invention in FIG. 13 is remarkably more invisible than that in FIG. 14. Furthermore, the way the main image is displayed in FIG. 13 is fashionable and attractive.

The following describes an inference as to why there is a difference in visibility of the display section 4. Specifically, (i) an image that is visible from the transmissive region TR and (ii) a light-shielded image of the light-shielding region B are visually observed from the display section 4 of FIG. 14. At this time, the eyes try to recognize an image by adjusting the pupils depending upon brightness of the image and the light-shielded image. As a result, the image of the transmissive region TR is visually observed by the observer.

On the other hand, outside light that is reflected in the mirror-surface display region M is visually observed from the display section of FIG. 13, in addition to the image of the transmissive region TR and the light-shielded image of the light-shielding region B. At this time, the eyes adjust the pupils depending upon the brightness of (i) the outside light, (ii) the image, and (iii) the light-shielded image. For this reason, it is considered to be significantly more difficult for the image of the display section 4 to be observed than in the case of FIG. 14, due to reflection light of the outside light. This is apparent from FIG. 13.

Further, evaluation of peek-prevention effect (shielding function) that is attempted by making the main image difficult to observe (or making the main image invisible), was performed on the portable phone 1 of the present embodiment. Furthermore, as a Comparative Example, the same evaluation was performed on a portable phone with a structure of Patent Document 1. Results of the Example are shown in Table 3 and FIG. 11, and results of the Comparative Example are shown in Table 4 and FIG. 12.

TABLE 3

| Example | | |
|---|---|---|
| EVALUATION LEVEL | PERCENTAGE | NUMBER OF PEOPLE |
| COMPLETELY ILLEGIBLE | 74% | 74 |
| MOSTLY ILLEGIBLE | 21% | 21 |
| SLIGHTLY LEGIBLE | 2% | 2 |
| COMPLETELY LEGIBLE | 0% | 0 |
| NOT SURE | 3% | 3 |
| TOTAL | 100% | 100 |

TABLE 4

| Comparative Example | | |
|---|---|---|
| EVALUATION LEVEL | PERCENTAGE | NUMBER OF PEOPLE |
| COMPLETELY ILLEGIBLE | 28% | 28 |
| MOSTLY ILLEGIBLE | 32% | 32 |
| SLIGHTLY LEGIBLE | 30% | 30 |
| COMPLETELY LEGIBLE | 8% | 8 |
| NOT SURE | 2% | 2 |
| TOTAL | 100% | 100 |

The following describes the method of the evaluation.
(1) Evaluation method: A display for evaluation is given to the person being tested, and the person observes the display at an angle of 45° from the right or the left with respect to the front direction. Then, evaluation was made on degree of legibility of information on the display for evaluation.
(2) Evaluation standards: 5-level evaluation (completely legible, slightly legible, mostly illegible, completely illegible, not sure)
(3) Number of people performing the evaluation: 100 (males and females whose ages are in twenties to forties)
(4) Display subject to evaluation
  Display section (base panel): 2.4 type QVGA (240×320 pixels) for portable phones
  Switching panel (liquid crystal layer): a square pattern of 1 mm×1 mm that is segmented into a plurality of regions having at least two different alignment directions of liquid crystal molecules (see FIG. 4).
(5) Evaluation pattern: the following texts in the quotation marks are displayed on the display section.
  "Incoming-mail tray
  2005/11/02 11:35
  Taro YAMADA
  Notice regarding tomorrow's meeting
  Time: 3 o'clock PM
  Place: Conference room 106 at the Office Wing
  Best regards."

It is confirmed that the peek-prevention effect (shielding function) from an oblique direction is significantly higher in the Example than that in the Comparative Example. This is apparent from a comparison between the results of the Example (Table 3 and FIG. 11) and the results of the Comparative Example (Table 4 and FIG. 12).

The present invention is not limited to the description of the embodiments above, but may be altered by a skilled person within the scope of the claims. An embodiment based on a proper combination of technical means disclosed in different embodiments is encompassed in the technical scope of the present invention.

As described above, the display apparatus according to the present invention includes a first polarizer, a second polarizer, a reflective polarizer, and a display switching section that is a liquid crystal layer including a plurality of regions having at least two different alignment directions of liquid crystal molecules of TN mode. Accordingly, it becomes possible by the difference in the alignment direction of the liquid crystal layer to (i) make the image difficult to observe by a sight-line from an oblique direction, and (ii) make the image significantly difficult to be observed by utilizing mirror-surface display caused by the reflective polarizer.

It is preferable in the display apparatus of the present invention that the display switching section switches, in response to a voltage (electric field) that is applied to the display switching section, which is the liquid crystal layer, to one of the following modes:

(A) a narrow viewing-angle mode where an image displayed on the picture display section is (i) visible from a front direction but (ii) difficult to be observed from an oblique direction;

(B) a wide viewing-angle mode where the image displayed on the picture display section is visible from any direction; and (C) a mirror mode where the picture display section is observed in a form of mirror-surface display from any direction.

In the above structure, the liquid crystal layer includes a plurality of regions having at least two different alignment directions of liquid crystal molecules of TN mode. In other words, the liquid crystal layer includes regions that are different in alignment direction of the liquid crystal molecules. With this arrangement, in a region where the liquid crystal molecules are directed to an orientation, for example the image is visible from a right oblique direction, whereas the image is difficult to observe (or invisible) from a left oblique direction. On the other hand, in a region where the liquid crystal molecules are directed to an orientation that is opposite to the orientation in the above region, the way the image is observed becomes opposite. In other words, the image is difficult to observe (or invisible) from the right oblique direction, whereas the image is visible from the left oblique direction. As the foregoing described, with the above structure, the narrow viewing-angle mode is realized by utilizing the difference in visibility of the image in oblique direction, which difference is caused by the alignment direction of the liquid crystal layer.

Further, in the above structure, the front face of the picture display section includes the first polarizer, the display switching section, the reflective polarizer, and the second polarizer. Accordingly, if all of these members are allowed to transmit light, then the structure becomes the same as the structure that includes only the picture display section. This allows the image of the picture display section to become visible from all directions. As such, the wide viewing-angle mode is achieved.

Further, in the above structure, the reflective polarizer is provided between (i) a rear side of the display switching section and the second polarizer. The reflective polarizer includes (i) a polarized-light transmission axis and a polarized-light reflectance axis that is orthogonal to the polarized-light transmission axis. For this reason, the reflective polarizer reflects polarized light that is parallel to the polarized-light reflectance axis. This makes it possible to realize mirror-surface display by causing polarized light that is parallel to the polarized-light reflectance axis to enter into the reflective polarizer. As the foregoing described, with the above structure, the mirror mode is realized with the use of the reflective polarizer.

Further, in the above structure, the display switching section (the liquid crystal layer) switches the three modes in response to a voltage (electric field) that is applied to the display switching section (the liquid crystal layer). In other words, three kinds of voltages are set in the display apparatus of the present invention, in order to execute three modes.

More concretely, the display apparatus of the present invention includes (i) an electrode (voltage (electric field) application section, voltage (electric field) application means) via which a voltage (electric field) corresponding to the respective modes is applied to the display switching section (liquid crystal layer), and (ii) a controller (controlling means) for causing a voltage to be applied to the electrode, which voltage corresponds to the respective modes. The controller applies, to the electrode, three kinds of voltages that correspond to the respective modes. The display switching section (liquid crystal layer) switches the three modes in response to an electric field that is applied to the display switching section (liquid crystal layer) according to the voltage applied to the electrode.

Specifically, in the present invention, the display switching section (liquid crystal layer) switches the three modes in response to the voltage applied to the display switching section (liquid crystal layer). This means that the display switching section (liquid crystal layer) switches the respective modes in response to the electric field that is applied to the display switching section (liquid crystal layer) according to the voltage set for the respective modes.

Accordingly, with the above structure, a display apparatus is provided that includes a wide viewing-angle mode, a narrow viewing-angle mode, and a mirror mode.

Note that Patent Document 1 also teaches a structure including a display switching section and a picture display section (multilayered panel structure). For example, the upper liquid crystal layer and the lower liquid crystal layer that are described in paragraphs [0128] to [0132] of Patent Document 1 (paragraphs [0128] to [0131] correspond to paragraphs [0146] to [0149] of U.S. Application Publication No. 2001/015782) correspond to the display switching section and the picture display section, respectively. According to Patent Document 1, (i) the mode is switched to the narrow viewing-angle mode by causing the upper liquid crystal layer to be in a halftone display state, and (ii) an electric field is applied to the upper liquid crystal layer so as to cause the liquid crystal molecules of the upper liquid crystal layer to stand. As such, evenness in displaying is achieved. This makes it possible to observe what displayed on the lower liquid crystal layer in the case where the observation is made from a direction other than the front direction (wide viewing-angle mode). In other words, according to Patent Document 1, it is possible to conduct the switching in such a way that what displayed on the lower liquid crystal layer is visible, or invisible, from a direction other than the front direction.

Further, Patent Document 2 teaches a display apparatus that is switched to (i) a mirror state by causing the liquid crystal molecules to stand and (ii) an image-displayed state by causing the voltage to be off.

However, it could not have easily been derived by the above disclosures to switch, as performed in the display apparatus of the present invention, the wide viewing-angle mode, the narrow viewing-angle mode, and the mirror mode. Especially, it could not have easily been derived that difficulty in observation of the image by a sight-line from an oblique direction is significantly improved in the narrow viewing-angle mode by utilizing the mirror-surface display.

As the foregoing described, in the display apparatus of the present invention, the display switching section switches the three modes in response to a voltage that is applied to the display switching section. It thus becomes possible to provide a display apparatus with the wide viewing-angle mode, the narrow viewing-angle mode, and the mirror mode.

It is preferable in the display apparatus of the present invention that the voltage, causing the liquid crystal layer to be switched into one of the modes (A) to (C), be set at 0V.

With the above arrangement, it becomes possible to save electric power of the display apparatus because the voltage causing the liquid crystal layer to be switched to one of the narrow viewing-angle mode, the wide viewing-angle mode, and the mirror mode is 0V.

In the display apparatus of the present invention, a voltage, causing the liquid crystal layer to be switched to the wide viewing-angle mode, is set at 0V.

By this way, it becomes possible to save electric power in the case where the wide viewing-angle mode is normally and frequently used. When necessary, the mode can be switched to the narrow viewing-angle mode or the mirror mode.

In the display apparatus of the present invention, a voltage, causing the liquid crystal layer to be switched into the narrow viewing-angle mode, is set more proximate to a voltage causing the liquid crystal layer to be switched into the wide viewing-angle mode than to a voltage causing the liquid crystal layer to be switched into the mirror mode.

With the above arrangement, a tilt of the liquid crystal molecules of the liquid crystal layer due to application of voltage becomes close to that of the liquid crystal molecules during the wide viewing-angle mode. Accordingly, it becomes possible to, especially, make an image displayed on the picture display section to observe from an oblique direction during the narrow viewing-angle mode. This is, therefore, effective especially in the case where importance is placed on the function of the narrow viewing-angle mode.

It is preferable in the display apparatus of the present invention that the liquid crystal layer be normally-white. With this arrangement, it becomes possible to, especially, make an image displayed on the picture display section to observe from an oblique direction during the narrow viewing-angle mode. This is, therefore, effective especially in the case where importance is placed on the function of the narrow viewing-angle mode.

It is preferable in the display apparatus of the present invention that the picture display section cause light emitted from a rear side of the picture display section to be off in the mirror mode. This prevents the light from illuminating the reflective polarizer from the picture display section, and therefore a mirror-surface is displayed more suitably. Note that causing the light emitted from the rear side of the picture display section to be off indicates that the light is prevented from illuminating the reflective polarizer from the picture display section. In other words, for example in the case where the picture display section is a liquid crystal display, that the backlight or the power source of the liquid crystal display is turned off, whereas the power source of the display is turned off in the case where the picture display section is a self-illuminating display.

An electronic device of the present invention includes the display apparatus described above.

This realizes an electronic device that allows, with a simple structure, a displayed image to be hidden from a certain direction by switching a mode, while image quality is maintained.

Note that, although a portable phone is described as an exemplary electronic device of the present invention in the above embodiments, the present invention is not limited to what described above.

The display apparatus of the present invention allows switching of the viewing-angle control function and the mirror function, and therefore is applicable to a display and the like of a portable electronic device such as a portable communication terminal, a mobile PC, an AV device, a DVD player and the like.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:
1. A display apparatus, comprising:
a picture display section for displaying an image;
a display switching section, on a front face of the picture display section, for electrically switching observation statuses of the picture display section in viewing-angle directions without changing the image displayed on the picture display section;
a first polarizer on a front face of the display switching section;
a second polarizer between the picture display section and the display switching section; and
a reflective polarizer between (i) a rear side of the display switching section and (ii) the second polarizer,
the display switching section being a liquid crystal layer including a plurality of regions having at least two different alignment directions of liquid crystal molecules of TN mode,
the liquid crystal layer switching, in response to a voltage that is applied to the liquid crystal layer, to at least (A) a narrow viewing-angle mode where an image displayed on the picture display section is (i) visible from a front direction but (ii) difficult to be observed from an oblique direction, wherein
during the narrow viewing-angle mode, a region where the image is difficult to be observed is partially displayed in mirror-surface displaying caused by the reflective polarizer by utilizing orientation of the liquid crystal layer.

2. The display apparatus according to claim 1, wherein the display switching section is sandwiched between a pair of substrates.

3. The display apparatus according to claim 2, wherein the liquid crystal layer switches, in response to a voltage that is applied to the liquid crystal layer, to one of following modes:
(A) a narrow viewing-angle mode where an image displayed on the picture display section is (i) visible from a front direction but (ii) difficult to be observed from an oblique direction;
(B) a wide viewing-angle mode where the image displayed on the picture display section is visible from any direction; and
(C) a mirror mode where the picture display section is observed in a form of mirror-surface display from any direction.

4. The display apparatus according to claim 3, wherein the liquid crystal layer includes an electrode via which a voltage is applied in accordance with the modes (A) to (C).

5. The display apparatus according to claim 3, wherein a voltage, causing the liquid crystal layer to be switched into one of the modes (A) to (C), is set at 0V.

6. The display apparatus according to claim 5, wherein a voltage, causing the liquid crystal layer to be switched into the wide viewing-angle mode, is set at 0V.

7. The display apparatus according to claim 3, wherein a voltage, causing the liquid crystal layer to be switched into the narrow viewing-angle mode, is set more proximate to a voltage causing the liquid crystal layer to be switched into the wide viewing-angle mode than to a voltage causing the liquid crystal layer to be switched into the mirror mode.

8. The display apparatus according to claim 3, wherein the picture display section causes light that is emitted from a rear side of the picture display section to be off during the mirror mode.

9. The display apparatus according to claim 2, wherein the liquid crystal layer is normally-white.

10. The display apparatus according to claim 7, wherein (C)>(A)>(B), where (C) is a voltage causing the liquid crystal layer to be switched into the mode (C), (A) is a voltage causing the liquid crystal layer to be switched into the mode (A), and (B) is a voltage causing the liquid crystal layer to be switched into the mode (B).

11. An electronic device including the display apparatus set forth in claim 1.

* * * * *